US008442765B1

(12) United States Patent
Ingvalson

(10) Patent No.: US 8,442,765 B1
(45) Date of Patent: May 14, 2013

(54) SHARED STATE SELECTION AND DATA EXCHANGE FOR COLLABORATIVE NAVIGATION USING CONDITIONALLY INDEPENDENT PARALLEL FILTERS

(71) Applicant: Honeywell International Inc., Morristown, NJ (US)

(72) Inventor: Ryan Ingvalson, Saint Michael, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/672,337

(22) Filed: Nov. 8, 2012

(51) Int. Cl.
G06F 17/00 (2006.01)

(52) U.S. Cl.
USPC ............. 701/505; 701/36; 701/494; 701/519; 701/532; 702/122; 702/188; 702/189; 429/143; 429/147; 429/419; 342/357.28; 342/372; 706/46; 706/52

(58) Field of Classification Search ............... 701/36, 701/494, 519, 532, 505, 38, 48, 54, 408, 701/470, 472; 702/122, 188, 189; 429/143, 429/419, 147; 342/357.28, 372, 146, 357.48, 342/458, 463; 706/46, 52; 709/202, 203, 709/217, 219, 223; 707/999.104, 999.107; 340/995.12, 995.19, 995.24; 705/53, 57, 705/80; 382/103, 278; 715/851
See application file for complete search history.

(56) References Cited

U.S. PATENT DOCUMENTS

| 6,323,807 | B1 | 11/2001 | Golding et al. |
|---|---|---|---|
| 6,496,816 | B1 | 12/2002 | Thiesson et al. |
| 6,882,959 | B2 | 4/2005 | Rui et al. |
| 7,240,042 | B2 | 7/2007 | Cheng et al. |
| 7,698,108 | B2 | 4/2010 | Haney et al. |
| 7,725,253 | B2 | 5/2010 | Foxlin |
| 7,821,453 | B2 | 10/2010 | Wu et al. |
| 2005/0216182 | A1 | 9/2005 | Hussain et al. |
| 2006/0027404 | A1 | 2/2006 | Foxlin |
| 2006/0064295 | A1 | 3/2006 | Schwaiger et al. |
| 2009/0048996 | A1 | 2/2009 | Bala |
| 2010/0017046 | A1 | 1/2010 | Cheung et al. |
| 2010/0274481 | A1 | 10/2010 | Krishnaswamy et al. |
| 2011/0070863 | A1 | 3/2011 | Ma et al. |
| 2012/0021764 | A1 | 1/2012 | Enright |
| 2012/0022784 | A1 | 1/2012 | Louis et al. |

(Continued)

OTHER PUBLICATIONS

European Patent Office, "Office Action", "from Foreign Counterpart of U.S. Appl. No. 13/053,811", Nov. 5, 2012, Published in: EP.

(Continued)

*Primary Examiner* — McDieunel Marc
(74) *Attorney, Agent, or Firm* — Fogg & Powers LLC

(57) ABSTRACT

A method for collaborative navigation comprises initializing a conditionally independent filter on a local platform, propagating the conditionally independent filter forward in time, and when a local measurement has been made, updating the conditionally independent filter with the local measurement. When a common measurement has been made, the conditionally independent filter is updated with the common measurement, and a determination is made whether a remote conditioning node has arrived from a remote platform. If a remote conditioning node has arrived, a determination is made whether the remote conditioning node needs to be fused with a local conditioning node of the conditionally independent filter. If the remote conditioning node needs to be fused, a node-to-node fusion is performed in the conditionally independent filter to merge the remote conditioning node with the local conditioning node to produce a merged conditioning node. A conditional update of the conditionally independent filter is then performed.

20 Claims, 7 Drawing Sheets

U.S. PATENT DOCUMENTS

2012/0121161 A1    5/2012  Eade et al.
2012/0243775 A1    9/2012  Ma et al.
2012/0245844 A1    9/2012  Lommel et al.

OTHER PUBLICATIONS

European Patent Office, "European Search Report", "from Foreign Counterpart of U.S. Appl. No. 13/053,811", Nov. 5, 2012, pp. 1-8, Published in: EP.

Chang et al, "MAP Track Fusion Performance Evaluation", "Proceedings of the Fifth International Conference on Information Fusion", Jul. 2002, pp. 512-519, vol. 1.

Frew, "Flight Demonstrations of Self-directed Collaborative Navigation of Small Unmanned Aircraft", Sep. 2004, pp. 1-14, Publisher: American Institute of Aeronautics and Astronautics.

Knuth, Joseph and Prabir Barooah, "Distributed Collaborative Localization of Multiple Vehicles from Relative Pose Measurements", "47th Annual Allerton Conference on Communication, Control, and Computing", Jun. 2009, pp. 314-321, Publisher: Allerton, Published in: Monticello, IL.

Kroetsch, "Towards Gaussian Multi-Robot SLAM for Underwater Robotics", Jul. 25, 2005.

Moratuwage et al., "Extending Bayesian RFS SLAM framework to Multi-Vehicle SLAM", 2012, pp. 1-6.

Moratuwage et al., "Collaborative Multi-Vehicle Localization and Mapping in Marine Environments", May 2010, pp. 1-6.

Nettleton, "Decentralized SLAM with Low-Bandwidth Communication for Teams of Vehicles", 2006, pp. 1-6.

Petrovskaya et al., "Model Based Vehicle Tracking for Autonomous Driving in Urban Environments", "Autonomous Robots Journal", Apr. 2009, pp. 123-139, vol. 26, No. 2-3.

Pinies et al., "Large Scale SLAM Building Conditionally Independent Local Maps: Application to Monocular Vision", "IEEE Transactions on Robotics", Oct. 2008, pp. 1-13, vol. 24, No. 5, Publisher: IEEE.

Pinies et al., "Scalable SLAM building Conitionally Independent Local Maps", "Proceedings of the 2007 IEEE/RSJ International Conference on Intelligent Robots and Systems", Oct. 29, 2007, pp. 3466-3471.

Riley, Jennifer M. and Mica R. Endsley, "Situation Awareness in HRI with Collaborating Remotely Piloted Vehicles", "Proceedings of the Human Factors and Ergonomics Society 49th Annual Meeting", Sep. 2005, pp. 407-411, Publisher: Human Factors and Ergonomics Society.

Roth et al., "Gibbs Likelihoods for Bayesian Tracking", Jun. 2004, pp. 1-8.

, "Vision Based Navigation and Precision/Dynamic Targeting for Air Vehicles (ImageNav)", "Available at www.virtualacquisitionshowcase.com/document/1301/briefing accessed Mar. 3, 2011", Nov. 2, 2009, pp. 1-5, Publisher: Scientific Systems Company, Inc.

Wang et al., "Simultaneous Localization, Mapping and Moving Object Tracking", Jun. 2007, pp. 1-47, vol. 26, Publisher: International Journal of Robotics Research.

Bahr et al, "Consistent Cooperative Localization", May 12, 2009, pp. 1-8.

Fox et al., "A Probabilistic Approach to Collaborative Multi-Robot Localization", "Autonomous Robots", Jun. 2000, pp. 1-25, vol. 8, No. 3.

Huang et al., "Observability-based Consistent EKF Estimators for Multi-robot Cooperative Localization", Jun. 2011, pp. 1-21, vol. 30, No. 1.

Roumeliotis et al., "Distributed Multirobot Localization", "IEEE Transactions on Robotics and Automation", Oct. 2002, pp. 781-795, vol. 18, No. 5.

Ingvalson, "Data Sharing Among Conditionally Independent Parallel Filters", "U.S. Appl. No. 13/679,170", Nov. 16, 2012, pp. 1-25.

SHARED STATE SELECTION AND DATA EXCHANGE FOR COLLABORATIVE NAVIGATION USING CONDITIONALLY INDEPENDENT PARALLEL FILTERS

BACKGROUND

Collaborative navigation allows two or more navigation platforms to work together by sharing information to produce a navigation solution that is better than if each navigation platform acted independently. For example, many autonomous unmanned aerial vehicles can operate and navigate in an environment for surveillance, remote sensing, or rescue. In a collaborative navigation system, these vehicles can cooperate to improve navigation by sharing information.

Communication between two moving navigation platforms is typically available sometime during collaborative navigation. The communication channels between the platforms are a necessary component of a collaborative navigation system as they allow the platforms to share information. The information of primary concern in collaborative navigation is the probabilistic dependence that arises between the platforms in the collaboration network. Collaborative navigation algorithms must account for this dependence, which arises in a number of ways. One example is when two platforms range to each other. Such a relative range measurement makes an observation of the position of both platforms simultaneously. As a result of one or more measurements like this, the navigation solutions of both platforms are probabilistically dependent. Another example is the multi-vehicle Simultaneous Localization and Mapping (SLAM) situation where each mobile platform observes landmark states and one or more of the landmarks is observed by each mobile platform. This observation of a common exogenous state also creates probabilistic dependence in the navigation solutions of the mobile platforms.

In collaborative navigation, a platform uses information from its own sensors, as well as information from other platforms, to enhance its own navigation solution. Since all platforms in the collaborative network play a similar role, they may all reap the benefit of an enhanced navigation solution. The SLAM method is one way for the navigation, that is, the information obtained by a sensor on a mobile platform is processed to obtain an estimate of its own position while building a map of the environment.

Previous methods for collaborative navigation have used a global centralized filter that includes all the navigation states for each platform, the dynamic state model for each platform, the measurement model of the sensors, and the landmarks (when using SLAM techniques). The disadvantage of a global centralized filter is that each platform must maintain estimates of all the states of all platforms, which means the centralized filter must have knowledge of all dynamic and measurement models of all platforms in the network. This is additional information that must be transmitted and shared at regular intervals, which means that centralized approaches are vulnerable to communication disruptions. Additionally, with large numbers of platforms collaborating, the size of the centralized state vector may result in a solution that is computationally impractical.

SUMMARY

A method for collaborative navigation comprises initializing a conditionally independent filter on a local platform, propagating the conditionally independent filter forward in time, and when a local measurement has been made, updating the conditionally independent filter with the local measurement. When a common measurement has been made, the conditionally independent filter is updated with the common measurement, and a determination is made whether a remote conditioning node has arrived from a remote platform for conditional update processing. If a remote conditioning node has arrived, a determination is made whether the remote conditioning node needs to be fused with a local conditioning node of the conditionally independent filter. If the remote conditioning node needs to be fused with the local conditioning node, a node-to-node fusion is performed in the conditionally independent filter to merge the remote conditioning node with the local conditioning node to produce a merged conditioning node. A conditional update of the conditionally independent filter is then performed.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the drawings, in which.

DETAILED DESCRIPTION

Figure 1:
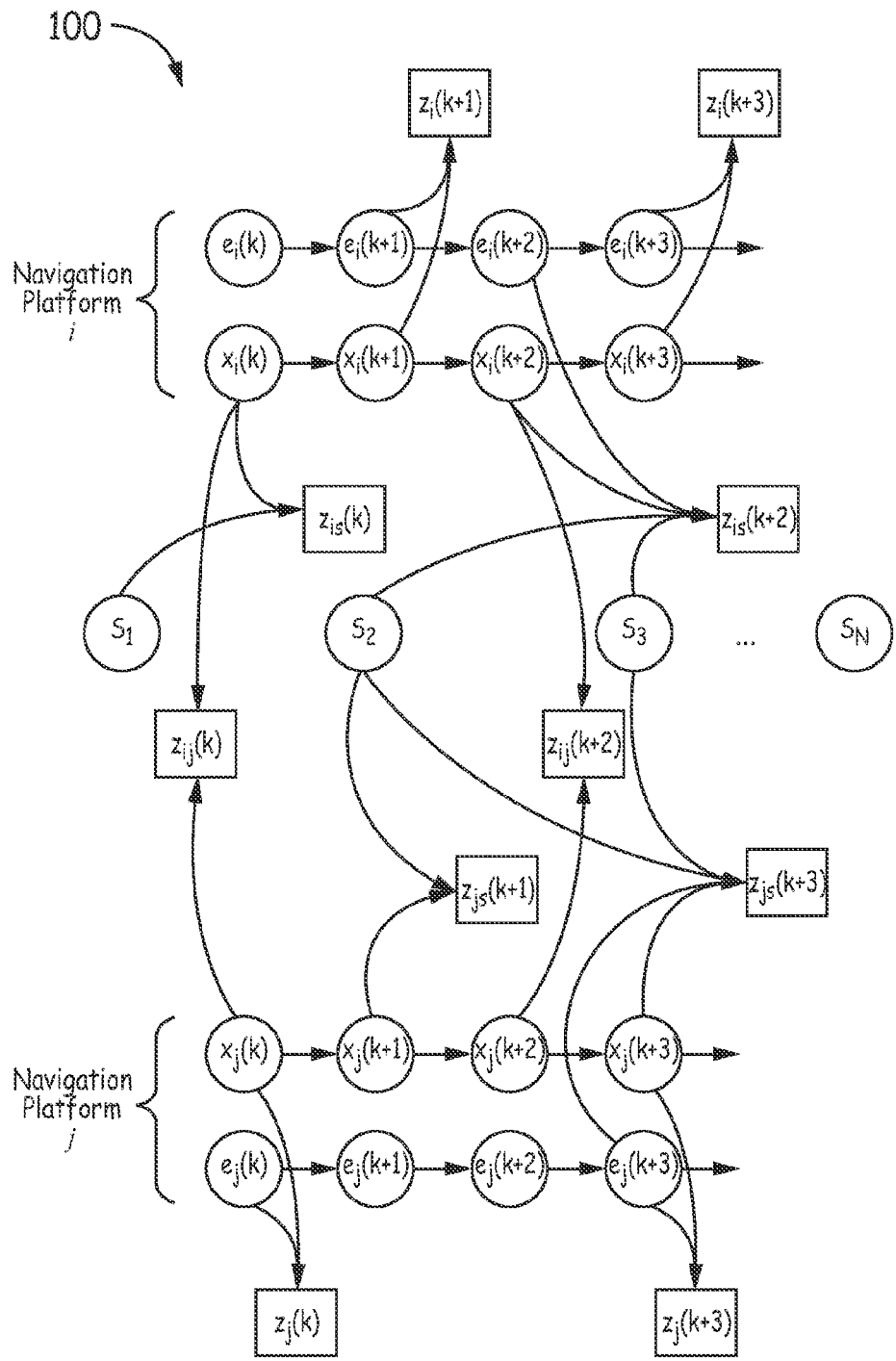
FIG. 1 is an exemplary dynamic Bayesian network graph for two navigation platforms in a collaborative navigation network.

In the following detailed description, reference is made to the accompanying drawings that form a part hereof, and in which is shown by way of illustration specific illustrative embodiments. It is to be understood, however, that other embodiments may be utilized and that logical, mechanical, and electrical changes may be made.

A method and system for collaborative navigation uses conditionally independent parallel filters for shared state selection and data exchange. The method defines and selects states required for a conditioning node in each pair of platforms in a collaborative navigation network.

The present approach does not suffer from the disadvantages of prior methods. In particular, the present approach does not require knowledge about the state dynamic and sensor models of other platforms, is not sensitive to communication disruptions, and maintains globally-consistent state estimates.

The present technique can be applied to any network topology, although the decentralized nature of this technique is limited to networks that do not contain cycles, that is, network topologies whose graphs are singly-connected. When network topology graphs have connectivity greater than one, then cycles exist in the topology. For these networks, the conditioning node selection methodology as well as the conditional updates and other algorithmic components still apply, but there may be a significant increase in the required system communication bandwidth in addition to a requirement for some form of centralization, such as the need to communicate the network topology to all the platforms in the network. When the network is restricted to be singly-connected, then bandwidth requirements are minimized and centralization is not needed.

As discussed further hereafter, dynamic Bayesian networks provide a framework for rigorously determining probabilistic relationships among all states of the navigation platforms in a collaborating network. This "Bayesian network" is different from the more general and simple notion of the "network topology". When discussing "network topology", with respect to the present approach, it is simply an undirected graph whose vertices are representative of each navigation platform in the network and the edges of the graph are defined whenever there is probabilistic dependence between the platforms. The "network topology" is, in a sense, a compressed form of the more complex dynamic Bayesian network representation of the collaborative navigation system. The "network topology" is not defined by the communication channels of the system.

The present method and system can be utilized in various collaborative navigation scenarios, such as in first responder systems, military operations, space navigation, mobile positioning, and others. Collaborative navigation is especially useful in GPS-denied applications, since it allows information, such as positioning knowledge, to be shared with other platforms in the network that are within communication range. In this way, platforms with little to no navigation knowledge can reap the benefit of nearby neighbors that have good navigational or positioning information.

Various modes of transport can be employed to mount platforms in the collaborative navigation network, such as unmanned aerial vehicles (UAVs), manned aircraft, ground vehicles, the body of a person, and the like.

Dynamic Bayesian Network Analysis

The present method utilizes Dynamic Bayesian Network (DBN) analysis, which is a graphical technique for system analysis that allows one to determine probabilistic dependency between states of a system. The "dynamic" aspect of DBN refers to how these dependencies change over time. All Bayesian networks (and DBNs) are a subset of the larger set of graphs called directed acyclic graphs (DAGs). A simple example of DBN is a conventional Kalman filter.

In determining the DBN for a collaborative navigation system, the states and measurements of the system are first classified into groups. The system states are divided into three categories: navigation platform states; exogenous platform states; and common states. The navigation platform states are the set of states that includes the main navigation states and all states that are dynamically coupled to the main navigation states. For example, in a strapdown inertial system with an inertial measurement unit (IMU), such states would include the position, velocity, and attitude states, and additionally the IMU sensor states (e.g., accelerometer and gyroscope biases) since these are dynamically coupled to the main navigation states via the system dynamics. The exogenous platform states are any states that are not dynamically coupled to the main navigation states of a platform, but may become probabilistically dependent upon the navigation states via measurement observations. For example, GPS range bias and barometer bias are exogenous platform states. Common states are any states that may be observed by more than one navigation platform in the network. Most notably, this would include SLAM landmark and feature states.

The measurements are also grouped into three categories: local measurements (defined by sensors that only observe navigation and exogenous states of one platform), common measurements (any measurement sensitive to a common state), and mutual measurements (sensitive to states of two platforms). Thereafter, time-varying states of the system are defined for all discrete times in which measurements are made. A DBN graph can then be made for an arbitrary network of collaborating platforms. The simplest example is a network of two vehicles, which is one form of a singly-connected topology. Additional examples having increased complexity, but still a singly-connected network of N-vehicles, are line and tree topologies. Topologies with connectivity greater than one all have cycles in their graphs. Cycles require increased bandwidth and some form of centralization for those platforms forming the cycle. Platforms represented by graph vertices outside the cycles, continue to operate in a singly-connected fashion without the need for increased bandwidth and centralized processing. An N-connected graph (i.e. fully-connected) is the most complex topology graph for an N-vehicle collaborative navigation network.

FIG. 1 is an exemplary DBN graph 100 for two navigation platforms i and j in a collaborative navigation network. Each of platforms i and j has a set of navigation states at time k, designated respectively as $x_i(k)$, $x_i(k+1)$, ..., and $x_j(k)$, $x_j(k+1)$, ... (including all dynamically coupled states, e.g., IMU error states), and a set of exogenous states at time k, designated as $e_i(k)$, $e_i(k+1)$, $e_j(k)$, $e_j(k+1)$, ... (e.g. aiding-sensor errors). The DBN graph 100 also indicates a state or set of states that are common to both platforms i and j, designated as $s_1$, $s_2$, $s_n$ (e.g., landmark(s)/feature(s) of terrain or surrounding environment). The DBN graph 100 further shows the local observations of platforms i and j at time k, designated respectively as $z_i(k+1)$, $z_i(k+3)$, and $z_j(k)$, $z_j(k+3)$, as well as shared/mutual observations of navigation states at time k, designated as $z_{ij}(k)$ and $z_{ij}(k+2)$. In addition, the DBN graph 100 depicts any local observations made by platforms i and j at time k that includes global landmark/feature state(s), designated as $z_{is}(k)$, $z_{ix}(k+2)$, and $z_{js}(k+1)$, $z_{js}(k+3)$ (e.g. a "SLAM" observation).

Figure 2:
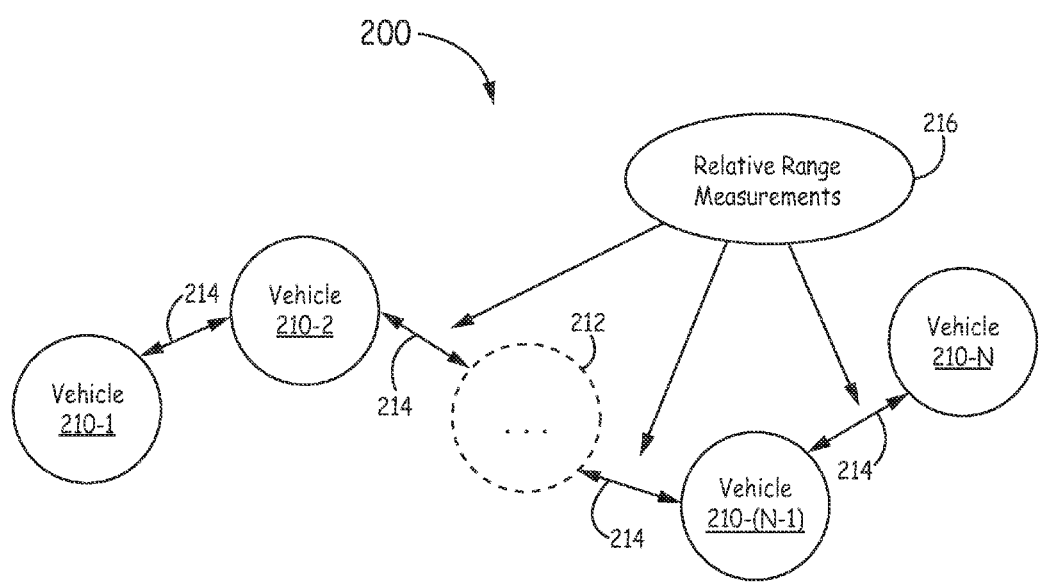
FIG. 2 illustrates a singly-connected collaborative navigation network according to one embodiment.

FIG. 2 shows one example of a singly-connected collaborative navigation network 100. The network 200 includes a plurality of vehicles that are singly connected to each other in series. For example, at one end of network 200 a vehicle 210-1 and a vehicle 210-2 are in operative communication with each other. At the other end of network 200, a vehicle 210-N and a vehicle 210-(N−1) are in operative communication with each other. One or more additional vehicles can be operatively connected between vehicle 210-2 and vehicle 210-(N−1) as indicated generally at 212.

Each of the vehicles in network 200 includes a navigation filter, such as a Kalman filter. A communication link 214 between each of the vehicles provides for sharing of data obtained by each vehicle with the other connected vehicle(s). Potential measurements that can be made by various sensors on the vehicles in network 200 include mutual measurements such as relative range measurements 216, as well as SLAM measurements. Other potential measurements include local measurements such as inertial, position-fix, Doppler (velocity), magnetometric, barometric, Global Positioning System (GPS), and the like.

For all network topologies, a DBN graph can be used to determine the conditioning node for each platform pair using the concept of directional separation (d-separation). In DBN analysis, if nodes A and B are "d-separated" given node C, then nodes A and B are conditionally independent given node C. There are rules within DBN analysis that provide methods for determining d-separation. When applied to collaborative navigation, if node A refers to the current state of a first navigation platform such as in vehicle 210-1, and node B refers to the current state of a second navigation platform such as in vehicle 210-2, then a set of states (nodes C) is sought such that nodes A and B are d-separated.

Figure 3A:
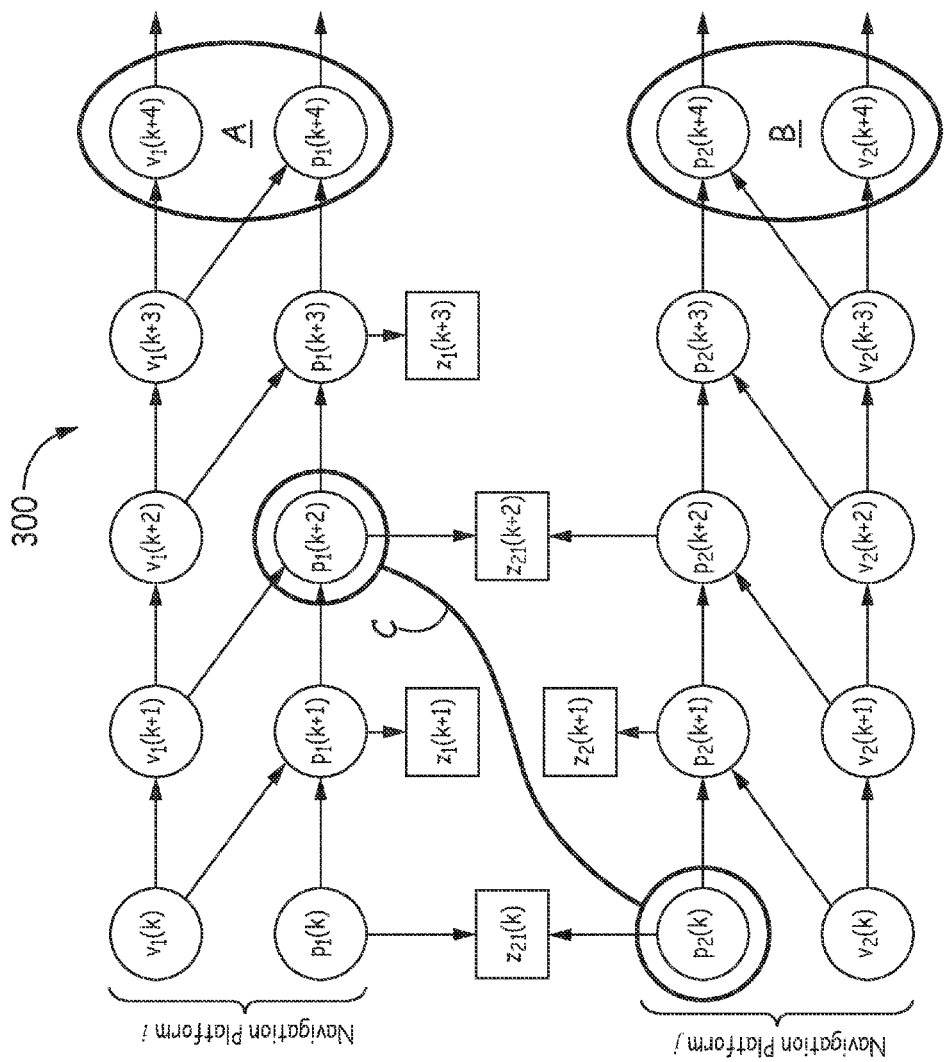
FIG. 3A is an exemplary dynamic Bayesian network graph for two navigation platforms in a collaborative navigation network, which shows one possible selected conditioning node.

In general, the set of states that d-separates two nodes is not necessarily unique. One set may be minimal, and likely the preferred set, but it need not be unique. In one example, a DBN graph 300 for navigation platforms i and j in a collaborative navigation network is shown in FIG. 3A. The network only includes a subset of navigation states, and only local and mutual measurements. The navigation states of platform i include position ($p_1$) and velocity ($v_1$) at given points in time (k, k+1, etc.). The navigation states of platform j include position ($p_2$) and velocity ($v_2$) also at given points in time. Local measurements of the platform i ($z_1$) are indicated at given points in time (k+1 and k+3), and a local measurement of platform j ($z_2$) is also indicated at a given point in time (k+1). Mutual measurements made by both platforms ($z_{21}$) are also shown at a given point in time.

A first node A of platform i and a second node B of platform j are depicted in FIG. 3A, as well as one example of a valid conditioning node C. The node A refers to the current state of platform i and includes a position state ($p_1(k+4)$) and a velocity state ($v_1(k+4)$). Likewise, node B refers to the current state of platform j and includes a position state ($p_2(k+4)$) and a velocity state ($v_2(k+4)$). In determining a valid conditioning node, one position state from each platform is selected for every mutual measurement made. This selection method for determining the conditioning node is referred to as "historical-state" conditioning. For example, as shown in FIG. 3A, conditioning node C can include a previous position state of node A (($p_1(k+2)$)) and a previous position state of node B ($p_2(k)$) where the mutual measurements were made by both platforms ($z_{21}(k)$ and $z_{21}(k+2)$). Other possible valid conditioning nodes that can be used in this scenario include position states $p_1(k)$ and $p_2(k+2)$, position states $p_1(k)$ and $p_1(k+2)$, or position states $p_2(k)$ and $p_2(k+2)$. Any of these combinations for node C result in nodes A and B being conditionally independent. As additional mutual measurements are made in the future, such as relative range measurements, node C is augmented with new position states such that node C continually grows. Eventually, the older position states are no longer useful and can be eliminated from node C. States are eliminated from a distribution estimate via marginalization. The foregoing approach allows all information to be passed between platforms through node C.

The example of FIG. 3A is an application specific application of the historical-state condition selection method, but in general, the important element of a historical-state conditioning node is that it includes a set of states for each time instance a mutual measurement ($z_{ij}$) occurred. The set of states augmented into the conditioning node for each mutual measurement ($z_{ij}$) is either the states from platform i observed by $z_{ij}$ or the states from platform j observed by $z_{ij}$. This applies to all mutual measurements that occurred between platforms i and j.

Figure 3B:
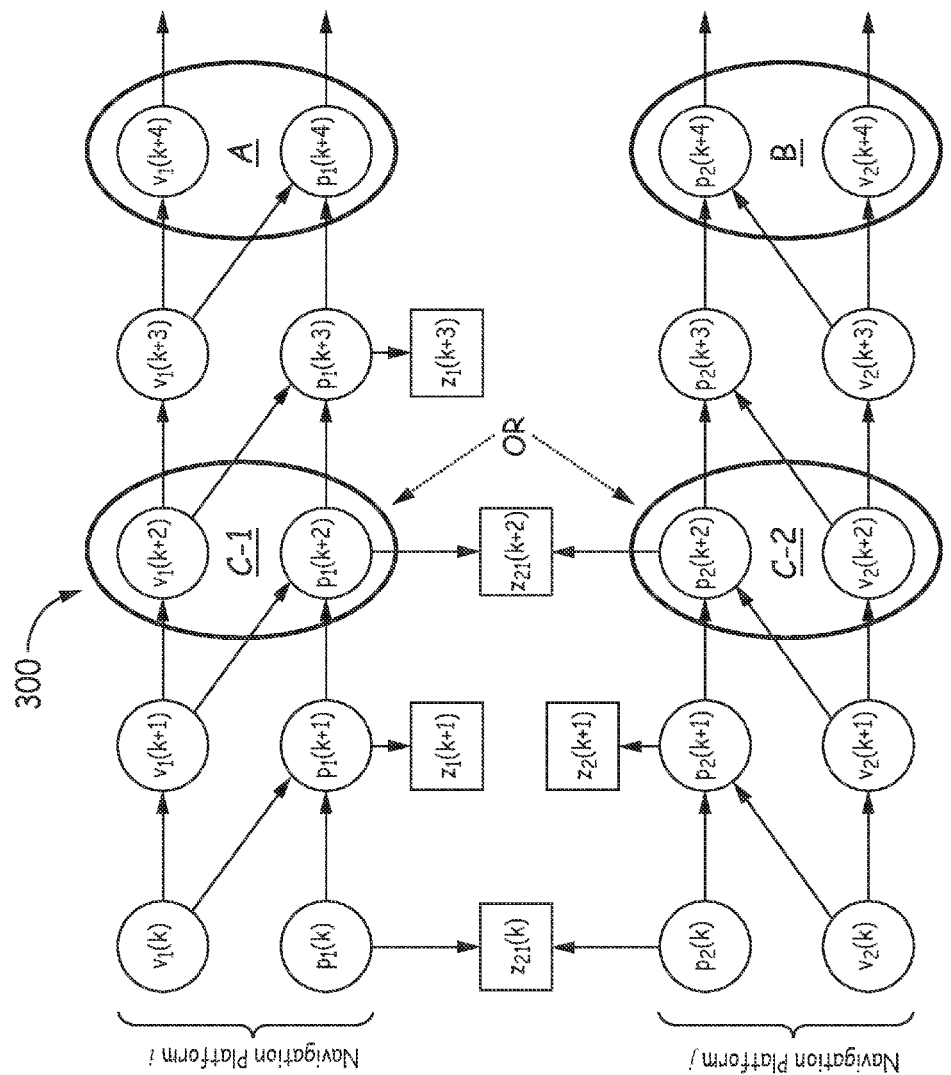
FIG. 3B shows the dynamic Bayesian network graph of FIG. 3A with alternate conditioning nodes selected.

In another example, the same DBN graph 300 is shown in FIG. 3B, except with alternate conditioning nodes C-1 or C-2 that can be selected. The conditioning node C-1 includes the full state vector of platform i, including a previous position state of node A ($p_1(k+2)$) and a previous velocity state of node A ($v_1(k+2)$) at the most recent point in time where a mutual measurement occurred ($z_{21}(k+2)$). The conditioning node C-2 includes the full state vector of platform j, including a previous position state of node B ($p_2(k+2)$) and a previous velocity state of node B ($v_2(k+2)$) at the most recent point in time where a mutual measurement occurred ($z_{21}(k+2)$). Selecting either of nodes C-1 or C2 results in conditional independence of nodes A and B since the active path between nodes A and B is broken. This selection method for determining the conditioning node is referred to as "full-state" conditioning. In the general case of full-state conditioning node selection, the conditioning node is the full-state (i.e., all navigation states and all exogenous states) of either platform i or platform j, at the most recent point in time where a mutual measurement ($z_{ij}$) occurred.

While both historical-state and full-state conditioning node selection methods apply to collaborative navigation systems involving only local and mutual measurements, these do not cover the general case involving SLAM measurements.

Similar DBN graphs can be made for any network of collaborating vehicles. Since the time-varying aspect of a DBN is based on discrete steps, each node in the DBN is stochastically represented as a random constant. This has as a very beneficial consequence in that the stochastic process model of all states in the conditioning node is known to all platforms, regardless of the type of state in the conditioning node. Thus, input control and process information does not need to be shared across platforms.

In a further example, if the network includes four platforms, and the first platform is dependent upon the other three platforms (in other words, the other platforms only communicate with the first platform, then three conditioning nodes need to be defined: C12, C13, and C14. The first platform needs to estimate all three of these conditioning nodes, but the second, third, and fourth platforms only need to each estimate one of the conditioning nodes: second platform, C12; third platform, C13; and fourth platform, C14.

In a method for collaborative navigation that employs the present approach, a network topology is determined, and the states tracked in the navigation platforms are also determined. The sensor and other measurements available on each platform are also determined. A DBN graph is then created for the collaborative navigation system. The concept of d-separation is then used to determine potential state sets that may act as the conditioning node. This may be done using the conditioning node selection methods of historical-state conditioning or full-state conditioning, for example.

A determination is then made if the conditioning node meets the communication bandwidth requirements of the system. Mitigation can optionally be done for inherently large "full-state" conditioning nodes. For example, the system can be analyzed for the effective conditional update "gain" due to states within the nodes, and states from the conditioning node that have negligible contribution to the gain are eliminated. Mitigation can also be done for continually growing "historical state" conditioning nodes. For example, the system can be analyzed for dependence between states in the conditioning node and the current state vector of each navigation platform. Over time the dependence may decay for some states in the conditioning node. In these situations the corresponding state provides no new information and may be eliminated from the conditioning node. Once the dependence-decay is understood for a given collaborative navigation application, the resulting size of the conditioning node can be ensured to meet the computational constraints of the computing platform by adjusting the frequency at which mutual measurements are made. This is possible since the size of the conditioning node is dependent upon the mutual measurement update rate and the rate of dependence-decay. Lastly, once the conditioning node has been defined for the given network topology, the data sharing methodology for the collaborative navigation system is complete, since it is now understood when and which states must be augmented and/or removing from the conditioning node.

Figure 4:
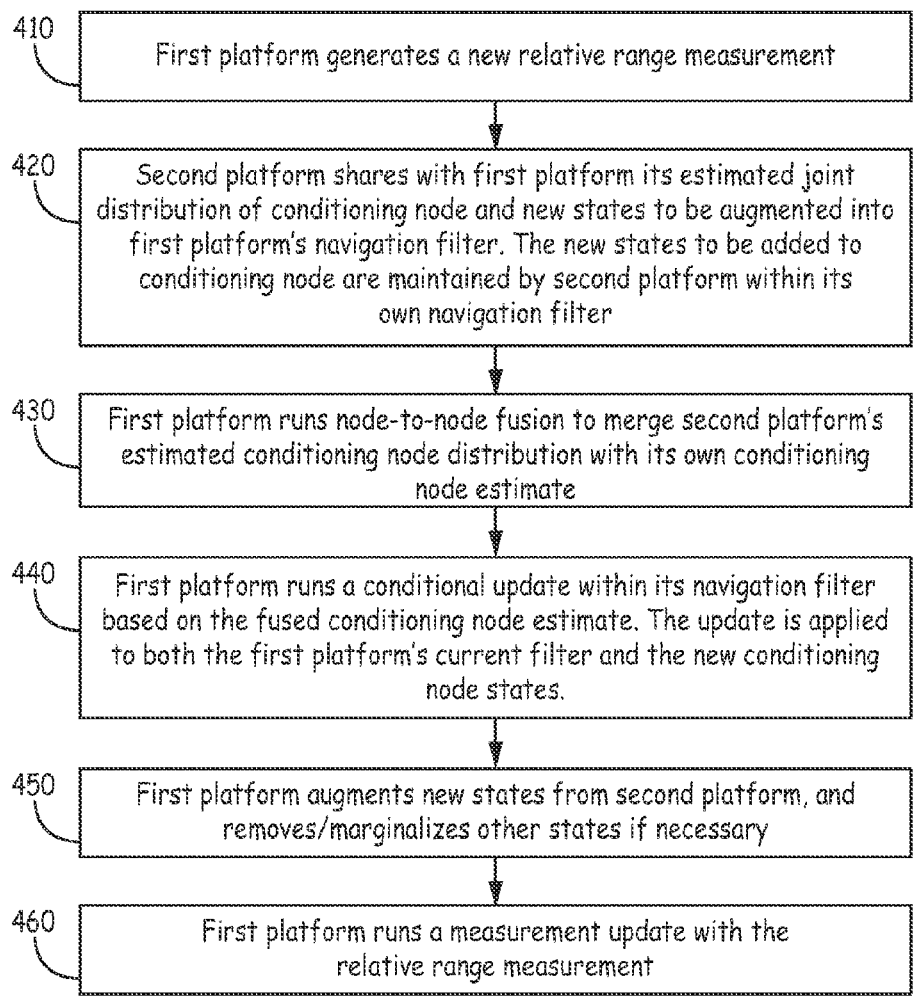
FIG. 4 is an algorithm flow diagram for an exemplary conditional update data exchange method for a pair of platforms operating in a collaborative navigation network.

FIG. 4 is a flow diagram for a conditional update data exchange method for a pair of navigation platforms operating in a collaborative navigation network with mutual measurements such as relative range measurements. The method generally includes data generation, data sharing, and data processing steps. At the start of the method, after establishing a communication link between a first platform and a second platform, the first platform generates a new mutual measurement such as a relative range measurement (block 410). The second platform then shares with the first platform its estimated joint distribution of the conditioning node and new states to be augmented into the first platform's navigation filter (block 420). Since the new states to be added to the conditioning node originate from the second platform's filter, the new states do not need to be augmented into the second platform's filter since they already exist. Instead, the new states must be retained and maintained by the second platform within its own navigation filter, as the new states are now part of the conditioning node.

Thereafter, the first platform runs a node-to-node fusion to merge the second platform's estimated conditioning node distribution with its own conditioning node estimate to obtain a fused conditioning node estimate (block 430). The first platform then runs a conditional update within its navigation filter based on the fused conditioning node estimate (block 440). The conditional update is applied to both the first platform's current filter and the new conditioning nodes states. The first platform augments new states (now updated in the previous step) from the second platform, and can remove or marginalize other states if necessary (block 450). The first platform then runs a measurement update with the mutual measurement such as the relative range measurement (block 460). The foregoing method can be repeated as necessary, with either the first platform or the second platform initiating the next round of data sharing.

The primary algorithmic components that can be employed to implement a method of collaborative navigation with conditionally independent parallel filters include one or more of a conditional state distribution update, state augmentation via conditional independence, and multi-directional shared state fusion, which are discussed in further detail as follows.

Conditional State Distribution Update

In order to implement the conditional state distribution update (also known as the data exchange method or conditional update), each local filter must be formulated as "conditionally independent" of one another. For any two filters to be conditionally independent there must be a set of states, shared by the two platforms, upon which perfect knowledge of those states renders the state distributions of the two filters independent. This property is known as conditional independence. When this property holds, the set of states is referred to as the "conditioning node" or the "shared state". Further details of this approach are described in copending U.S. application Ser. No. 13/053,811, entitled COLLABORATIVE NAVIGATION USING CONDITIONAL UPDATES, the disclosure of which is incorporated by reference.

First suppose two submaps are built given some set of observations Z:

$$p(x_A, x_C | Z)$$

$$p(x_B, x_C | Z).$$

If $x_A$, $x_B$, and $x_C$ represent all states in a global map, then it is possible to reconstruct the global map from the two submaps given the above when the submaps have been formulated such that $x_A$ and $x_B$ are conditionally independent given $x_C$, which is referred to as the Conditional Independence (CI) property by Pinies and Tardos in their paper, *Scalable SLAM Building Conditionally Independent Local Maps*, Proceedings of the 2007 IEEE/RSJ International Conference on Intelligent Robots and Systems, pp. 3466-3471, San Diego, Calif. (2007), the disclosure of which is incorporated by reference. They showed how the global map can be built from the two CI submaps, where the reconstructed global map is:

$$p(x_A, x_B, x_C | Z)$$

which is the joint distribution of $x_A$, $x_B$, and $x_C$ given observations Z. Construction of the global map is related to the process of state augmentation and will be discussed later. Additionally, Pinies and Tardos showed how the CI property can be used to share information between submaps via a process they call "back propagation," herein referred to as the "conditional update" and will be described next.

First suppose the two submaps given above (which satisfy the CI property) have each been updated independently with an additional sets of measurements, $z_1$ and $z_2$, such that:

$$p(x_A, x_C | Z, z_1)$$

$$p(x_B, x_C | Z, z_2)$$

where $z_1$ are observations only of states $x_A$ and $x_C$, and $z_2$ are observations only of states $x_B$ and $x_C$. The goal then becomes the formation of submaps:

$$p(x_A, x_C | Z, z_1, z_2)$$

$$p(x_B, x_C | Z, z_1, z_2)$$

which is possible to do if it holds that $x_A$ and $x_B$ are conditionally independent given $x_C$. By the CI property (shown by Pinies and Tardos):

$$P(x_A | x_C, Z, z_1, z_2) = P(x_A | x_C, Z, z_1).$$

From the standard conditional probability equations:

$$\frac{p(x_A, x_C | Z, z_1, z_2)}{p(x_C | Z, z_1, z_2)} = \frac{p(x_A, x_C | Z, z_1)}{p(x_C | Z, z_1)}$$

which can then finally be rewritten as:

$$p(x_A, x_C | Z, z_1, z_2) = p(x_A, x_C | Z, z_1) \frac{p(x_C | Z, z_1, z_2)}{p(x_C | Z, z_1)}. \quad \text{(Eqn. 1)}$$

Equation 1 governs the "conditional update" as described by Pinies and Tardos as "back propagation". Additionally, they solved the equations specifically for Gaussian distributions, whereas Equation 1 is general for all distributions. As another distinguishing characteristic, the above derivation has assumed conditionally independent parallel filters, which were not considered by Pinies and Tardos, as their application did not necessitate such filters. The impact of this is that the marginal distribution $p(x_C | Z, z_1, z_2)$ does not appear in, nor can it be directly computed from, either submap, where in the Pinies and Tardos application all terms on the right side of Equation 1 could be directly computed from the submaps using marginalization. But in the case of conditionally independent parallel filters, this is not the case; and, thus, $p(x_C | Z,$ $z_1, z_2$) must be computed in an additional algorithmic step, which is the subject of later discussion.

Augmentation via Conditional Independence

The present technique allows for augmenting states from one filter into another filter using the conditional independence principle. Since the states in the conditioning node change, entire state distributions need to be shared and augmented into other filters in some situations. This process of augmentation is called "conditionally independent state augmentation." Next, it will be shown how to reconstruct the global map, as it will have direct application to the goal of state augmentation.

Revisiting the original submaps (the ones conditioned only on Z), recall that the two submaps have been formulated such that $x_A$ and $x_B$ are conditionally independent given $x_C$, which may be written as:

$$p(x_A, x_B | Z, x_C) = p(x_A | Z, x_C) p(x_B | Z, x_C). \quad \text{(Eqn. 2)}$$

Then, from basic conditional probabilities:

$$p(x_A, x_B | Z, x_C) = \frac{p(x_A, x_B, x_C | Z)}{p(x_C | Z)}. \quad \text{(Eqn. 3)}$$

Combining the previous two equations gives:

$$\frac{p(x_A, x_B, x_C | Z)}{p(x_C | Z)} = p(x_A | Z, x_C) p(x_B | Z, x_C)$$

which may then be rearranged as:

$$p(x_A, x_B, x_C | Z) = p(x_A | z, x_C) p(x_B | z, x_C) p(x_C | Z)$$

$$= p(x_A | Z, x_C) p(x_B, x_C | Z)$$

$$= \frac{p(x_A, x_C | Z)}{p(x_C | Z)} p(x_B, x_C | Z)$$

$$= \frac{p(x_A, x_C | Z) p(x_B, x_C | Z)}{p(x_C | Z)}.$$

The last equation shows how the global map can be reconstructed from the two submaps: $p(x_A, x_C | Z)$ and $p(x_B, x_C | Z)$, and from $p(x_C | Z)$, which may be obtained via marginalization of either submap. Marginalization is a standard technique in probability theory, and $p(x_C | Z)$ is computed as:

$$p(x_C | Z) = \int p(x_A, x_C | Z) dx_A.$$

Returning to the specific application of conditionally independent parallel filters for collaborative navigation, in general, reconstruction of the entire global map is not needed. But the present collaborative navigation algorithms do require that the conditioning node ($x_C$ in this analysis) change from time to time by adding a subset of the states from one filter or the other into the conditioning node. The process of augmenting states from one filter into another is very similar to the process of reconstructing the global map, since it too is a process of computing a new joint distribution of larger dimension.

The goal of augmenting a subset of states from one submap into another is equivalent to computing the joint distribution of an existing submap and the subset of states form the other filter. To this end, the states of one submap are partitioned into two portions:

$$x_B = \begin{bmatrix} x_{B_1} \\ x_{B_2} \end{bmatrix}$$

and let $x_{B_2}$ be the partition to augment into submap $p(x_A, x_C | Z)$. Thus, the goal is now the construction of the joint distribution $p(x_A, x_C, x_{B_2} | Z)$.

If it is true that if $x_A$ and $x_B$ are conditionally independent given $x_C$, then any subset of $x_B$ is also conditionally independent of $x_A$ given $x_C$. Starting from an equation similar to Eqn. 2 in the above derivation of the reconstruction of the global map:

$$p(x_A, x_{B_2} | Z, x_C) = p(x_A | Z, x_C) P(x_{B_2} | Z, x_C).$$

From here forward the derivation is trivial. The only difference is in the subscript $B_2$ instead of B, allowing one to directly write:

$$p(x_A, x_C, x_{B_2} | Z) = \frac{p(x_A, x_C | Z) p(x_{B_2}, x_C | Z)}{p(x_C | Z)}.$$

This equation is the fundamental equation governing the method of augmentation via conditional independence. Once this augmentation is complete, the new joint distribution can be repartitioned to define the new conditioning node as $x'_C = [x_C^T x_2^B]^T$.

The only new factor in the above equation is $p(x_{B_2}, x_C | Z)$, which is easily obtained via marginalization of the submap $p(x_B, x_C | Z)$. First noting that $p(x_B, x_C | Z) = p(x_{B_1}, x_{B_2}, x_C | Z)$, the following equation can be computed:

$$p(x_{B_2}, x_C | Z) = \int p(x_{B_1}, x_{B_2}, x_C | Z) dx_{B_1}.$$

The need for augmentation is dependent on the configuration of the collaborative network. Some networks, based on their design, will require augmentation and others will not. For example, in the case where mutual measurements such as relative range measurements are employed, augmentation is required.

Multi-directional Shared State Fusion

When two conditionally independent filters need to simultaneously share their new information, it is necessary to merge the estimates of the conditioning node by running a fusion algorithm. The problem of merging conditioning node estimates from local filters is known as "track fusion." Track fusion typically addressed regarding the fusion of only two tracks at a time, but in general may apply to an arbitrary number of tracks. Some exemplary approaches to track fusion are disclosed in Chang et al., *MAP Track Fusion Performance Evaluation*, Proceedings of the Fifth International Conference on Information Fusion, vol. 1, pp. 512-519 (2002), the disclosure of which is incorporated herein by reference.

In one example of a two-platform network, suppose that two conditionally independent filters have the following state vectors:

$$x_1 = [x_A x_C]^T \text{ (first filter)}$$

$$x_2 = [x_B x_C]^T \text{ (second filter)}$$

with joint probability density functions (pdfs):

$$p(x_1) = p(x_A, x_C)$$

$$p(x_2) = p(x_B, x_C)$$

where $x_A$ is the unique state(s) of the first filter, $x_B$ is the unique state(s) of the second filter, and $x_C$, is the common states between the first and second filters. If states $x_A$ and $x_B$ are conditionally independent given state $x_C$, then:

$$p(x_A, x_B | x_C) = p(x_A | x_C) \cdot p(x_B | x_C).$$

Next suppose that at some point the first and second filters are initialized with the same measurement set Z, that is there are distributions:

$$p(x_A, x_C | Z) \text{ and } p(x_B, x_C | Z).$$

Then suppose the first filter makes independent measurement $z_1$, so its distribution estimate becomes:

$$p(x_A, x_C | Z, z_1).$$

In their paper by using the conditional independence property, Pinies and Tardos showed how to update the second filter using only the marginal distribution $p(x_C | Z, z_1)$ from the first filter and its own prior estimate $p(x_B, x_C | Z)$ to obtain:

$$p(x_B, x_C | Z, z_1).$$

But now, suppose that the first and second filters are operating in parallel and that simultaneous to the first filter generating estimate $p(x_A, x_C | Z, z_1)$, the second filter generates estimate $p(x_B, x_C | Z, z_2)$. In this case, the goal is to generate the following estimates:

$$p(x_A, x_C | Z, z_1, z_2) \text{ and } p(x_B, x_C | Z, z_1, z_2)$$

from the marginal distributions: $p(x_C | Z, z_1)$ and $p(x_C | Z, z_2)$. To do this, these marginal distributions must be merged to form the estimate: $p(x_C | Z, z_1, z_2)$. This is a problem of track-to-track fusion, which is a well known problem to those skilled in the art. For this application of conditionally independent filters, this step is also referred to as node-to-node fusion of the conditioning nodes.

Figure 5:
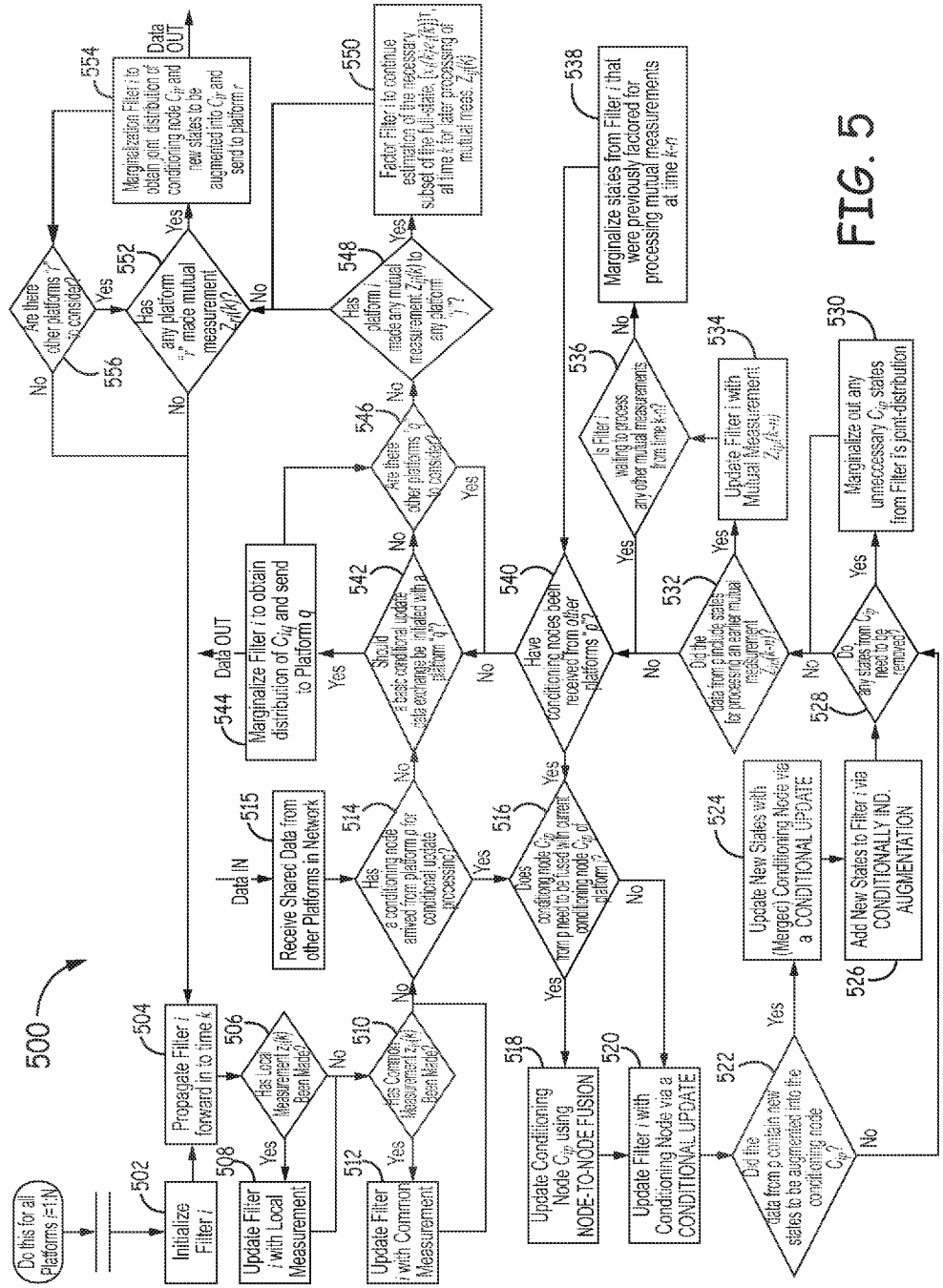
FIG. 5 is an algorithm flow diagram for an exemplary method of collaborative navigation between a plurality of platforms in a network.

FIG. 5 is a flow diagram for an exemplary method 500 for collaborative navigation between a plurality of platforms in a network, which implements the algorithmic components of a conditional state distribution update, state augmentation via conditional independence, and multi-directional shared state fusion. The method 500 can be implemented for all platform filters (i=1:N) in a network. At the start of method 500, a conditionally independent filter i in a local platform is initialized (block 502), and the filter i is propagated forward in to time k (block 504). The method then determines whether a local measurement ($z_i(k)$) has been made by the local platform (block 506). If yes, the filter i is updated with the local measurement (block 508). A determination is then made whether a common measurement ($z_{is}(k)$) has been made (block 510). If yes, the filter i is updated with the common measurement (block 512). The method then determines whether a remote conditioning node has arrived from a remote platform (designated as platform "p") for conditional update processing (block 514). At this point, shared data from one or more other platforms in the network has been received through a data input (block 515). If a remote conditioning node has arrived, the method determines whether the remote conditioning node ($c_{ip}$) needs to be fused with a first local conditioning node ($c_{ip}$) of the filter i (block 516). If yes, the first local conditioning node is updated using node-to-node fusion (multi-directional shared state fusion) to produce a merged conditioning node (block 518). The method then updates the filter i via a conditional update (conditional state distribution update) and uses the merged conditioning node to do this when produced (block 520).

A determination is then made whether data from the remote platform contains new states to be augmented into the first local conditioning node or the merged conditioning node (block 522). If yes, the method updates the new states with the first local conditioning node or the merged conditioning node via a conditional update (block 524), and the new states are added to the filter i via conditionally independent augmentation (state augmentation via conditional independence) (block 526). A determination is then made whether any states from the first local conditioning node or the merged conditioning node need to be removed as being unnecessary (block 528). If yes, the method marginalizes out any unnecessary $c_{ip}$ states from a joint-distribution of the filter i (block 530). A determination is then made whether any data from the remote platform include states for processing an earlier mutual measurement ($z_{ip}(k-n)$) (block 532). If yes, the filter i is updated with the mutual measurement $z_{ip}(k-n)$ (block 534). A determination is then made whether the filter i is waiting to process any other mutual measurements from time k-n (block 536). If not, the method marginalize states from the filter i that were previously factored for processing mutual measurements at time k-n (block 538).

A determination is then made whether conditioning nodes have been received from one or more other remote platforms (block 540). If yes, the foregoing method is repeated starting at block 516. If conditioning nodes have not been received from any other remote platforms, a determination is made whether to initiate a basic conditional update data exchange with another remote platform (designated as platform "q") (block 542). If yes, the method marginalizes the filter i to obtain a distribution of a second local conditioning node $c_{iq}$, which is sent to the remote platform q through a data output (block 544). A determination is then made whether there are any other remote platforms q with which to consider initiating a basic conditional update data exchange (block 546). If yes, the method repeats starting at block 542.

If there are no other remote platforms to consider, the method determines whether the local platform has made any mutual measurement ($z_{ij}(k)$) to any other remote platform (designated as platform "j") (block 548). If yes, filter i is factored such that the necessary subset of the full-state ($[x_i(k)\ e_i(k)]^T$) at time k is maintained online in the posterior joint-distribution of filter i for later processing of the mutual measurement ($z_{ij}(k)$) (block 550). The method then determines whether any remote platform (designated as platform "r") has made a mutual measurement ($z_{ri}(k)$) to the local platform (block 552). If yes, the method marginalizes the filter i to obtain to obtain a joint-distribution of a third local conditioning node $c_{ir}$ and new states to be augmented into the conditioning node $c_{ir}$, which are sent to the remote platform r through a data output (block 554). A determination is then made whether there are any other remote platforms r to consider (block 556). If yes, the method repeats starting at block 552. If there are no other platforms r to consider, the method returns to block 504 where filter i is propagated forward in time and the method is repeated.

Returning to block 514 in FIG. 5, if a conditioning node has not arrived from a remote platform, the method determines whether to initiate a basic conditional update data exchange with a remote platform q (block 542). The method then goes forward from block 542 as described above.

Navigation System

Figure 6:
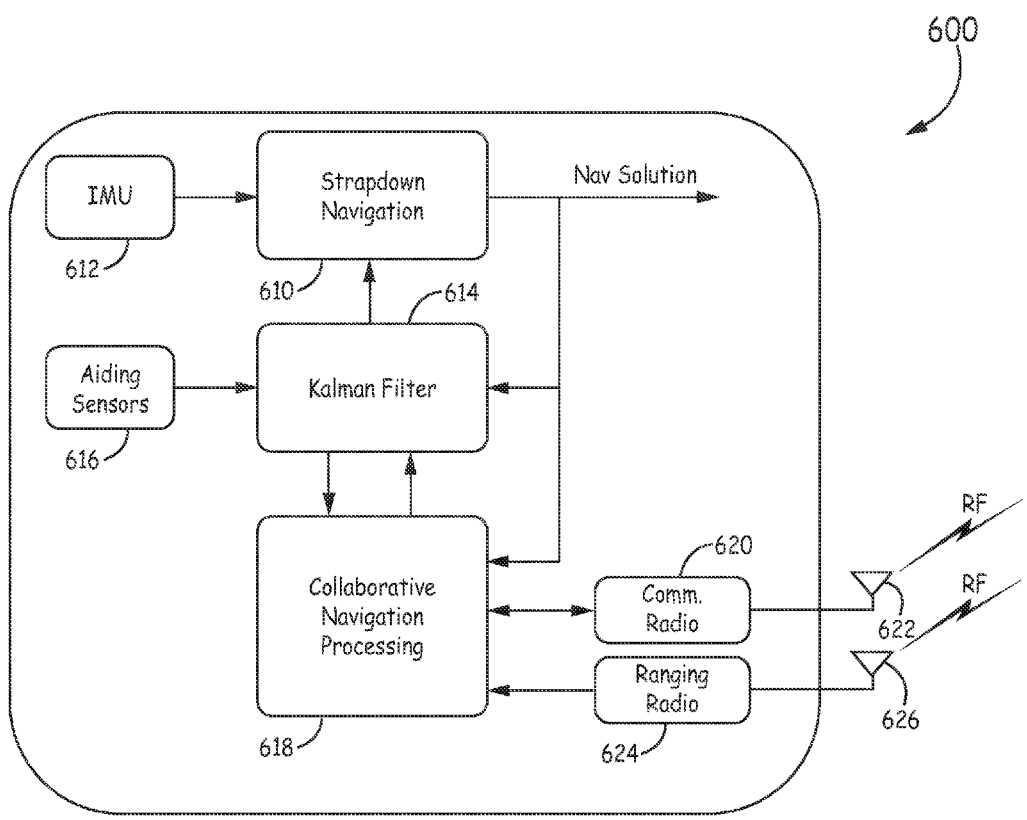
FIG. 6 is a block diagram of a navigation system according to one embodiment for a platform that is part of a collaborative navigation network.

FIG. 6 is block diagram of one example of a navigation system 600 for a local platform that can be part of a collaborative navigation network with other remote platforms. The system 600 includes a dead-reckoning unit 610 onboard the local platform that outputs a navigation solution. The dead-reckoning unit 610 can include a strapdown navigation module or other navigation aid. In one embodiment, an inertial measurement unit (IMU) 612 sends inertial data to dead-reckoning unit 610. A navigation filter 614 such as a Kalman filter is in operative communication with dead-reckoning unit

610. A Kalman filter is used in the case of linear models and Gaussian distributions, but other estimators may be employed such as a non-linear filter.

One or more aiding sensors 616 can be employed to send local sensor data to navigation filter 614. The aiding sensors 616 include all local and common measurement sensors such as position and velocity sensors. The navigation filter 614 also receives the navigation solution from dead-reckoning unit 610. A collaborative navigation processing unit 618 is in operative communication with navigation filter 614, and provides the processing that handles the collaborative navigation functions. The collaborative navigation processing unit 618 also receives the navigation solution from dead-reckoning unit 610. A communications unit 620, which can be wired or wireless, such as a communications radio, provides for data sharing with other platforms in the collaborative navigation network through radio frequency (RF) signals transmitted or received by an antenna 622. A ranging radio unit 624 provides for relative range measurement and is one example of a sensor that makes mutual measurements. Relative range measurements are made with other platforms through RF signals transmitted or received by an antenna 626.

The collaborative navigation processing unit 618 is configured to execute processor readable instructions to perform collaborative navigation. In one implementation, these instructions include defining a conditioning node for at least one pair of platforms that includes the local platform and at least one remote platform in the collaborative navigation network, and generating a mutual measurement such as a relative range measurement at the local platform. An estimated joint distribution of the conditioning node is received from the remote platform at the local platform along with new states to be augmented into navigation filter 614. A node-to-node fusion in the local platform is performed to merge the remote platform's estimated joint distribution of the conditioning node with an estimated joint distribution of the conditioning node at the local platform to obtain a fused conditioning node estimate. A conditional update in navigation filter 614 is then carried out based on the fused conditioning node estimate. A measurement update in the local platform can then be performed with the mutual measurement such as the relative range measurement.

A computer or processor used in the present system and method can be implemented using software, firmware, hardware, or any appropriate combination thereof, as known to one of skill in the art. These may be supplemented by, or incorporated in, specially-designed application-specific integrated circuits (ASICs) or field programmable gate arrays (FPGAs). The computer or processor can also include or function with software programs, firmware, or other computer readable instructions for carrying out various process tasks, calculations, and control functions used in the present method and system.

The present methods can be implemented by computer executable instructions, such as program modules or components, which are executed by at least one processor. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer readable instructions. These instructions are typically stored on any appropriate computer program product that includes a computer readable medium used for storage of computer readable instructions or data structures. Such a computer readable medium can be any available media that can be accessed by a general purpose or special purpose computer or processor, or any programmable logic device.

Suitable computer readable storage media may include, for example, non-volatile memory devices including semiconductor memory devices such as Random Access Memory (RAM), Read Only Memory (ROM), Electrically Erasable Programmable ROM (EEPROM), or flash memory devices; magnetic disks such as internal hard disks or removable disks; optical storage devices such as compact discs (CDs), digital versatile discs (DVDs), Blu-ray discs; or any other media that can be used to carry or store desired program code in the form of computer executable instructions or data structures.

EXAMPLE EMBODIMENTS

First embodiment includes a method for collaborative navigation comprising: (a) initializing a conditionally independent filter on a local platform; (b) propagating the conditionally independent filter forward in time; (c) when a local measurement has been made, updating the conditionally independent filter with the local measurement; (d) when a common measurement has been made, updating the conditionally independent filter with the common measurement; (e) determining whether a remote conditioning node has arrived from a remote platform for conditional update processing; (f) if a remote conditioning node has arrived, determining whether the remote conditioning node needs to be fused with a first local conditioning node of the conditionally independent filter; (g) if the remote conditioning node needs to be fused with the first local conditioning node, performing a node-to-node fusion in the conditionally independent filter to merge the remote conditioning node with the first local conditioning node to produce a merged conditioning node; and (h) performing a conditional update of the conditionally independent filter.

Second embodiment includes the method of the first embodiment, and further comprising after performing the conditional update, determining whether data from the remote platform contains new states to be augmented into the first local conditioning node or the merged conditioning node. If data from the remote platform contains new states to be augmented, the method updates the new states with the first local conditioning node or the merged conditioning node via a conditional update, and adds the new states to the conditionally independent filter via conditionally independent augmentation.

Third embodiment includes the method of any of the 1-2 embodiment, and further comprising determining whether any states in the first local conditioning node or merged conditioning node are unnecessary and removable, and if there are any states that are unnecessary and removable, marginalizing out the unnecessary states from a joint-distribution of the conditionally independent filter.

Fourth embodiment includes the method of any of the 1-3 embodiment, and further comprising determining whether any data from the remote platform include states for processing an earlier mutual measurement, updating the conditionally independent filter with the mutual measurement when present, determining whether the conditionally independent filter is waiting to process any other mutual measurements, and if there are no other mutual measurements to process, marginalizing states from the conditionally independent filter that were previously factored for processing mutual measurements.

Fifth embodiment includes the method of any of the 1-4 embodiment, and further comprising determining whether conditioning nodes have been received from one or more other remote platforms, and if conditioning nodes have been received from one or more other remote platforms, repeating the method starting at (f) in Example 1.

Sixth embodiment includes the method of the fifth embodiment, wherein if conditioning nodes have not been received from one or more other remote platforms, the method further comprises determining whether to initiate a basic conditional update data exchange with the one or more other remote platforms, and if the basic conditional update data exchange is to be initiated, marginalizing the conditionally independent filter to obtain a distribution of a second local conditioning node. The second local conditioning node is then sent to the one or more other remote platforms.

Seventh embodiment includes the method of any of the 5-6 embodiment, and further comprising determining whether the local platform has made a mutual measurement to the one or more other remote platforms, and if the local platform has made a mutual measurement to the one or more other remote platforms, factoring the conditionally independent filter to continue estimation of a necessary subset of a full-state for later processing of the mutual measurement made to the one or more other remote platforms.

Eighth embodiment includes the method of any of the 5-7 embodiment, and further comprising determining whether the one or more other remote platforms has made a mutual measurement to the local platform, and if the one or more other remote platforms have made a mutual measurement to the local platform, then for each of the one or more other remote platforms, marginalizing the conditionally independent filter to obtain a joint-distribution of a local conditioning node and new states to be augmented into the local conditioning node. The local conditioning nodes and new states to be augmented are then sent to each of the one or more other remote platforms, respectively.

Nineth embodiment includes the method of any of the 1-8 embodiment, wherein if there are no other remote platforms to consider, repeating the method starting at (b) of first embodiment, where the conditionally independent filter is propagated forward in time.

Tenth embodiment includes the method of any of the 1-9 embodiment, wherein if a remote conditioning node has not arrived from the remote platform, the method further comprises determining whether to initiate a basic conditional update data exchange with one or more other remote platforms, and if the basic conditional update data exchange is to be initiated, then for each of the one or more other remote platforms, marginalizing the conditionally independent filter to obtain a distribution of a local conditioning node. The local conditioning nodes are then sent to each of the one or more other remote platforms, respectively.

Eleventh embodiment includes the method of any of the 1-10 embodiment, wherein the first local conditioning node and the remote conditioning node are defined in a dynamic Bayesian network graph.

Twelfth embodiment includes the method of any of the 1-11 embodiment, wherein the local platform is located on a manned aircraft, an unmanned aerial vehicle, a ground vehicle, or a person.

Thirteenth embodiment includes the method of any of the 1-12 embodiment, wherein the remote platform is located on a manned aircraft, an unmanned aerial vehicle, a ground vehicle, or a person.

Fourteenth embodiment includes a navigation system for a local platform in a collaborative navigation network, the system comprising a dead-reckoning unit onboard the local platform that outputs a navigation solution, a navigation filter in operative communication with the dead-reckoning unit, a communications unit that shares data with one or more remote platforms in the network, and a collaborative navigation processing unit in operative communication with the navigation filter. The collaborative navigation processing unit is configured to execute processor readable instructions to perform a method comprising defining a conditioning node for at least one pair of platforms that includes the local platform and at least one remote platform in the collaborative navigation network; receiving an estimated joint distribution of the conditioning node from the remote platform at the local platform along with new states to be augmented into the navigation filter; performing a node-to-node fusion in the local platform to merge the remote platform's estimated joint distribution of the conditioning node with an estimated joint distribution of the conditioning node at the local platform to obtain a fused conditioning node estimate; and performing a conditional update in the navigation filter of the local platform based on the fused conditioning node estimate.

Fifteenth embodiment includes the system of 14-15 embodiment, wherein the dead-reckoning unit comprises an inertial measurement unit that sends inertial data to a strapdown navigation module.

Sixteenth embodiment includes the system of any of 14-15 embodiment, wherein the communications unit is wired or wireless.

Seventeenth embodiment includes the system of any of 14-16 embodiment, further comprising one or more aiding sensors that send local sensor data to the navigation filter, and a ranging radio that determines a relative range measurement between the local platform and the at least one remote platform.

Eighteenth embodiment includes the system of any of 14-17 embodiment, wherein the collaborative navigation processing unit is configured to execute processor readable instructions to perform the method further comprising generating a relative range measurement at the local platform, and performing a measurement update in the local platform with the relative range measurement after performing the conditional update.

Nineteenth embodiment includes the system of any of 14-18 embodiment, wherein the local platform is located on a manned aircraft, an unmanned aerial vehicle, a ground vehicle, or a person.

Twentieth embodiment includes a computer program product comprising a non-transitory computer readable medium having instructions stored thereon executable by a processor to perform a method for collaborative navigation between at least one pair of platforms, the method comprising defining a conditioning node for the pair of platforms based on local states and prior data measurements of the pair of platforms; generating a mutual measurement at a first platform in the pair of platforms; receiving an estimated joint distribution of the conditioning node from a second platform in the pair of platforms at the first platform along with new states to be augmented into a navigation filter of the first platform, wherein new states to be added to the conditioning node are maintained in a navigation filter of the second platform; performing a node-to-node fusion in the first platform to merge the second platform's estimated joint distribution of the conditioning node with an estimated joint distribution of the conditioning node at the first platform to obtain a fused conditioning node estimate; performing a conditional update in the navigation filter of the first platform based on the fused conditioning node estimate, wherein the conditional update is applied to both the first platform's current navigation filter and new conditioning nodes states; augmenting the new states from the second platform into the navigation filter of the first platform and removing any unnecessary states from the navigation filter of the first platform; and performing a measurement update in the first platform with the mutual measurement.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A method for collaborative navigation, comprising:
    (a) initializing a conditionally independent filter on a local platform;
    (b) propagating the conditionally independent filter forward in time;
    (c) when a local measurement has been made, updating the conditionally independent filter with the local measurement;
    (d) when a common measurement has been made, updating the conditionally independent filter with the common measurement;
    (e) determining by a processor whether a remote conditioning node has arrived from a remote platform for conditional update processing;
    (f) if a remote conditioning node has arrived, determining by the processor whether the remote conditioning node needs to be fused with a first local conditioning node of the conditionally independent filter;
    (g) if the remote conditioning node needs to be fused with the first local conditioning node, performing a node-to-node fusion in the conditionally independent filter to merge the remote conditioning node with the first local conditioning node to produce a merged conditioning node; and
    (h) performing a conditional update of the conditionally independent filter.

2. The method of claim 1, further comprising:
    after performing the conditional update, determining whether data from the remote platform contains new states to be augmented into the first local conditioning node or the merged conditioning node;
    if data from the remote platform contains new states to be augmented:
        updating the new states with the first local conditioning node or the merged conditioning node via a conditional update; and
        adding the new states to the conditionally independent filter via conditionally independent augmentation.

3. The method of claim 2, further comprising:
    determining whether any states in the first local conditioning node or merged conditioning node are unnecessary and removable; and
    if there are any states that are unnecessary and removable, marginalizing out the unnecessary states from a joint-distribution of the conditionally independent filter.

4. The method of claim 3, further comprising:
    determining whether any data from the remote platform include states for processing an earlier mutual measurement;
    updating the conditionally independent filter with the mutual measurement when present;
    determining whether the conditionally independent filter is waiting to process any other mutual measurements; and
    if there are no other mutual measurements to process, marginalizing states from the conditionally independent filter that were previously factored for processing mutual measurements.

5. The method of claim 4, further comprising:
    determining whether conditioning nodes have been received from one or more other remote platforms; and
    if conditioning nodes have been received from one or more other remote platforms, repeating the method starting at (f).

6. The method of claim 5, wherein if conditioning nodes have not been received from one or more other remote platforms, the method further comprising:
    determining whether to initiate a basic conditional update data exchange with the one or more other remote platforms;
    if the basic conditional update data exchange is to be initiated, marginalizing the conditionally independent filter to obtain a distribution of a second local conditioning node; and
    sending the second local conditioning node to the one or more other remote platforms.

7. The method of claim 6, further comprising:
    determining whether the local platform has made a mutual measurement to the one or more other remote platforms; and
    if the local platform has made a mutual measurement to the one or more other remote platforms, factoring the conditionally independent filter to continue estimation of a necessary subset of a full-state for later processing of the mutual measurement made to the one or more other remote platforms.

8. The method of claim 7, further comprising:
    determining whether the one or more other remote platforms has made a mutual measurement to the local platform;
    if the one or more other remote platforms have made a mutual measurement to the local platform, then for each of the one or more other remote platforms, marginalizing the conditionally independent filter to obtain a joint-distribution of another local conditioning node and new states to be augmented into the another local conditioning node; and
    sending the another local conditioning node and new states to be augmented to each of the one or more other remote platforms, respectively.

9. The method of claim 8, wherein if there are no other remote platforms to consider, repeating the method starting at (b) where the conditionally independent filter is propagated forward in time.

10. The method of claim 1, wherein if a remote conditioning node has not arrived from the remote platform, the method further comprising:
    determining whether to initiate a basic conditional update data exchange with one or more other remote platforms;
    if the basic conditional update data exchange is to be initiated, then for each of the one or more other remote platforms, marginalizing the conditionally independent filter to obtain a distribution of another local conditioning node; and
    sending the another local conditioning node to each of the one or more other remote platforms, respectively.

11. The method of claim 1, wherein the first local conditioning node and the remote conditioning node are defined in a dynamic Bayesian network graph.

12. The method of claim 1, wherein the local platform is located on a manned aircraft, an unmanned aerial vehicle, a ground vehicle, or a person.

13. The method of claim 12, wherein the remote platform is located on a manned aircraft, an unmanned aerial vehicle, a ground vehicle, or a person.

14. A navigation system for a local platform in a collaborative navigation network, the system comprising:
- a dead-reckoning unit onboard the local platform that outputs a navigation solution;
- a navigation filter in operative communication with the dead-reckoning unit;
- a communications unit that shares data with one or more remote platforms in the network; and
- a collaborative navigation processing unit in operative communication with the navigation filter, the collaborative navigation processing unit configured to execute processor readable instructions to perform a method comprising:
  - defining a conditioning node for at least one pair of platforms that includes the local platform and at least one remote platform in the collaborative navigation network;
  - receiving an estimated joint distribution of the conditioning node from the remote platform at the local platform along with new states to be augmented into the navigation filter;
  - performing a node-to-node fusion in the local platform to merge the remote platform's estimated joint distribution of the conditioning node with an estimated joint distribution of the conditioning node at the local platform to obtain a fused conditioning node estimate; and
  - performing a conditional update in the navigation filter of the local platform based on the fused conditioning node estimate.

15. The system of claim 14, wherein the dead-reckoning unit comprises an inertial measurement unit that sends inertial data to a strapdown navigation module.

16. The system of claim 14, wherein the communications unit is wired or wireless.

17. The system of claim 14, further comprising:
- one or more aiding sensors that send local sensor data to the navigation filter; and
- a ranging radio that determines a relative range measurement between the local platform and the at least one remote platform.

18. The system of claim 17, wherein the collaborative navigation processing unit is configured to execute processor readable instructions to perform the method further comprising:
- generating a relative range measurement at the local platform; and
- performing a measurement update in the local platform with the relative range measurement after performing the conditional update.

19. The system of claim 14, wherein the local platform is located on a manned aircraft, an unmanned aerial vehicle, a ground vehicle, or a person.

20. A computer program product, comprising:
- a non-transitory computer readable medium having instructions stored thereon executable by a processor to perform a method for collaborative navigation between at least one pair of platforms, the method comprising:
  - defining a conditioning node for the pair of platforms based on local states and prior data measurements of the pair of platforms;
  - generating a mutual measurement at a first platform in the pair of platforms;
  - receiving an estimated joint distribution of the conditioning node from a second platform in the pair of platforms at the first platform along with new states to be augmented into a navigation filter of the first platform, wherein new states to be added to the conditioning node are maintained in a navigation filter of the second platform;
  - performing a node-to-node fusion in the first platform to merge the second platform's estimated joint distribution of the conditioning node with an estimated joint distribution of the conditioning node at the first platform to obtain a fused conditioning node estimate;
  - performing a conditional update in the navigation filter of the first platform based on the fused conditioning node estimate, wherein the conditional update is applied to both the first platform's current navigation filter and new conditioning nodes states;
  - augmenting the new states from the second platform into the navigation filter of the first platform and removing any unnecessary states from the navigation filter of the first platform; and
  - performing a measurement update in the first platform with the mutual measurement.

* * * * *